United States Patent [19]

Via et al.

[11] Patent Number: 5,718,553
[45] Date of Patent: Feb. 17, 1998

[54] TIRE PRESENTER

[75] Inventors: Michael D. Via, Ortonville; Ralph D. Stiff, Flushing; Eric T. Hartman, Sterling Heights, all of Mich.

[73] Assignee: American Commercial Industries, Inc., Cleveland, Ohio

[21] Appl. No.: 257,727

[22] Filed: Jun. 9, 1994

[51] Int. Cl.$^6$ ............................................. B62D 43/04
[52] U.S. Cl. ........................................ 414/463; 224/42.23
[58] Field of Search ........................... 414/462, 463, 414/464; 224/42.21, 42.23

[56] References Cited

U.S. PATENT DOCUMENTS

| | | |
|---|---|---|
| 702,275 | 6/1902 | Arnold . |
| 808,273 | 12/1905 | Darlington . |
| 903,819 | 11/1908 | Holcomb . |
| 1,364,442 | 1/1921 | Lawrence ............... 414/463 |
| 3,011,605 | 12/1961 | Hungerford, Jr. et al. . |
| 3,187,914 | 6/1965 | Péras ..................... 414/463 |
| 3,390,864 | 7/1968 | Searcy et al. ........... 414/463 |
| 3,429,521 | 2/1969 | Jones . |
| 3,447,643 | 6/1969 | Ulhing . |
| 3,554,397 | 1/1971 | Verl Cluff ............... 414/463 |
| 3,726,371 | 4/1973 | Versoy . |
| 3,734,323 | 5/1973 | Price ...................... 414/463 |
| 3,874,536 | 4/1975 | Watanabe . |
| 3,977,652 | 8/1976 | Mauch . |
| 4,047,629 | 9/1977 | Klein ...................... 414/463 |
| 4,059,197 | 11/1977 | Iida . |
| 4,492,506 | 1/1985 | Hoagland et al. ....... 414/463 |
| 4,544,136 | 10/1985 | Denman et al. . |
| 4,625,947 | 12/1986 | Denman et al. . |
| 4,693,453 | 9/1987 | Ivan . |
| 4,705,318 | 11/1987 | Yamada et al. . |
| 4,915,358 | 4/1990 | Stallings . |
| 4,969,630 | 11/1990 | Denman et al. . |
| 5,060,912 | 10/1991 | Guarr . |
| 5,238,358 | 8/1993 | Higgins et al. ......... 414/463 |
| 5,297,913 | 3/1994 | Au ......................... 414/463 |
| 5,314,288 | 5/1994 | Schmidt .................. 414/463 |

FOREIGN PATENT DOCUMENTS

| | | |
|---|---|---|
| 1014447 | 8/1957 | Germany . |
| 2816681 | 10/1979 | Germany . |
| 57-47259 | 3/1982 | Japan . |

*Primary Examiner*—Karen B. Merritt
*Assistant Examiner*—Douglas A. Hess
*Attorney, Agent, or Firm*—Rader, Fishman & Grauer

[57] ABSTRACT

A spare wheel storage apparatus for a vehicle includes a mechanism for moving a spare wheel between a storage position and an unloading position along a path of travel, and a wheel presentation mechanism for presenting the wheel extending at least to a partially exposed unloading position from underneath the vehicle, wherein the spare wheel extends generally horizontally with a portion protruding outwardly with respect to a vertical plane corresponding to an outermost external periphery of the vehicle body contour. The wheel presentation mechanism includes first and second elongated, flexible members, such as cables, wires or the like, connected to the vehicle body portion at positions disposed between the storage position and the vertical plane corresponding to the vehicle body contour. Each of the flexible members has one end connected to a wheel engaging member, and an opposite end connected to the vehicle body portion at positions spaced laterally from one another with respect to the path of travel of the spare wheel for providing lateral stability of the spare wheel during travel from the storage position to the unloading position. Preferably, the flexible member is a cable or pair of cables attached to the rim retainer or other wheel engaging member and also attached to the rear of the vehicle. If required, a pulley can be supplied adjacent the winch to better guide the cable into the winch and to prevent cross threading.

9 Claims, 2 Drawing Sheets

FIG-1

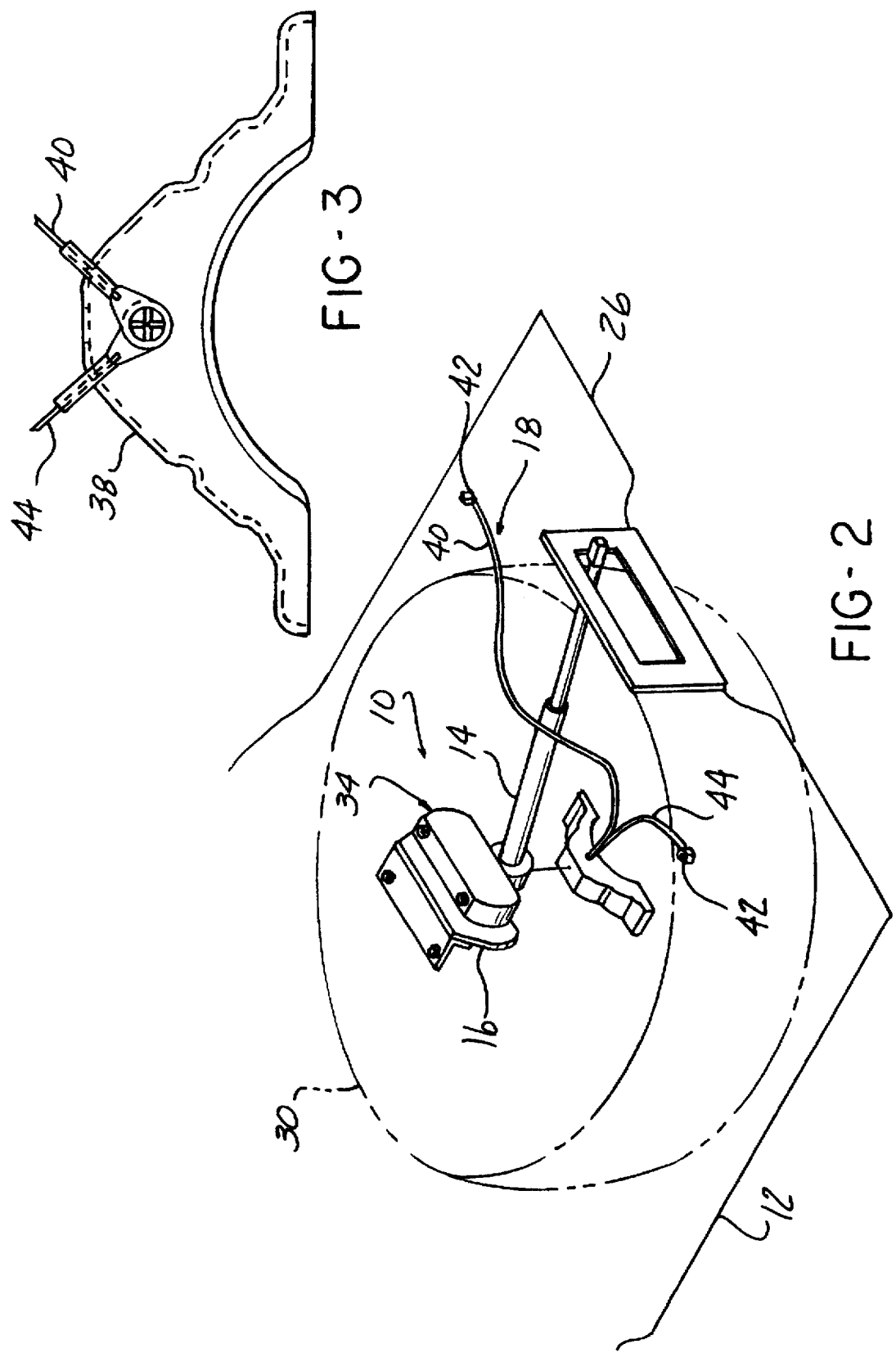

TIRE PRESENTER

FIELD OF THE INVENTION

The present invention relates to a spare wheel storage apparatus for moving a spare wheel from an under vehicle body position to a wheel unloading position along a path of travel, and in particular, to a device for presenting the spare wheel extending at least partially external of a vehicle body vertical contour when the spare wheel is in the unloading position after traveling along the path of travel having a non-vertical component of travel.

BACKGROUND OF THE INVENTION

Spare wheel storage in a vehicle has always been a problem. Designers have found it exceedingly difficult to mount the spare wheel so as to make it accessible and easy to retrieve and replace. Mounting the spare wheel in a location under the vehicle body for storage requires the addition of a tire lift-and-carry device, such as a spare tire carrier and winch. A suitable example of a spare tire carrier and winch can be found in U.S. Pat. No. 5,228,661. The inherent problem with spare tire carriers and winches of this type, and the under vehicle body storage location, is that the winch is capable of only lifting, lowering and/or carrying the spare wheel in a generally vertical line essentially directly below and in line with the drum of the winch. This limitation requires an individual operator to reach under the vehicle body in order to pull or drag the spare wheel out from under the vehicle from its position generally directly below and in line with the drum of the winch.

Therefore, it is desirable in the present invention to provide a spare wheel presenter capable of presenting a spare wheel extending at least partially external of a vehicle body vertical contour when the spare wheel is in the wheel unloading position after having traveled along a path from an under vehicle body storage position.

SUMMARY OF THE INVENTION

According to the present invention, a spare wheel storage apparatus is provided for moving a spare wheel from an under vehicle body storage position to a wheel unloading position along a path of travel. The storage apparatus includes winch means for raising and lowering the wheel to and from the storage position. The winch means includes an elongated, flexible member connected to a wheel engaging member. Wheel presentation means is provided for presenting the wheel extending at least partially external of a vehicle body vertical contour when the wheel is in the wheel unloading position. The path of travel has an upper, generally vertical, region of travel and a lower, presentation region of travel. The presentation region of travel is a non-linear region of travel. The presentation region of travel has a vertical component and a non-vertical component of travel. The wheel presentation means may include at least one elongated, flexible member connected to a wheel engaging member at one end and connected to an under vehicle body portion at an opposite end. The elongated, flexible member is connected to the under vehicle body portion at a position disposed between the storage position and the vehicle body vertical contour. Preferably, the flexible member is rotatably connected to the wheel engaging member.

In the preferred embodiment of the present invention, first and second elongated, flexible members are provided. Each of the first and second elongated, flexible members is connected to the wheel engaging member at one end and connected to an under vehicle body portion at an opposite end. The first and second elongated, flexible members are connected to the under vehicle body portion at positions disposed between the storage position and the vehicle body vertical contour. The opposite ends of the first and second elongated, flexible members are preferably level with one another, spaced laterally from one another and centered with respect to the path of travel for lateral stability of the wheel during travel from the storage position to the unloading position. Preferably, the first and second elongated, flexible members are rotatably connected to the wheel engaging member.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a simplified schematic perspective view of the spare wheel presenter according to the present invention; and FIG. 3 is a detailed view showing a rotatable connection between first and second elongated flexible members and a wheel engaging member.

DESCRIPTION OF THE PREFERRED EMBODIMENT

Figure 1:
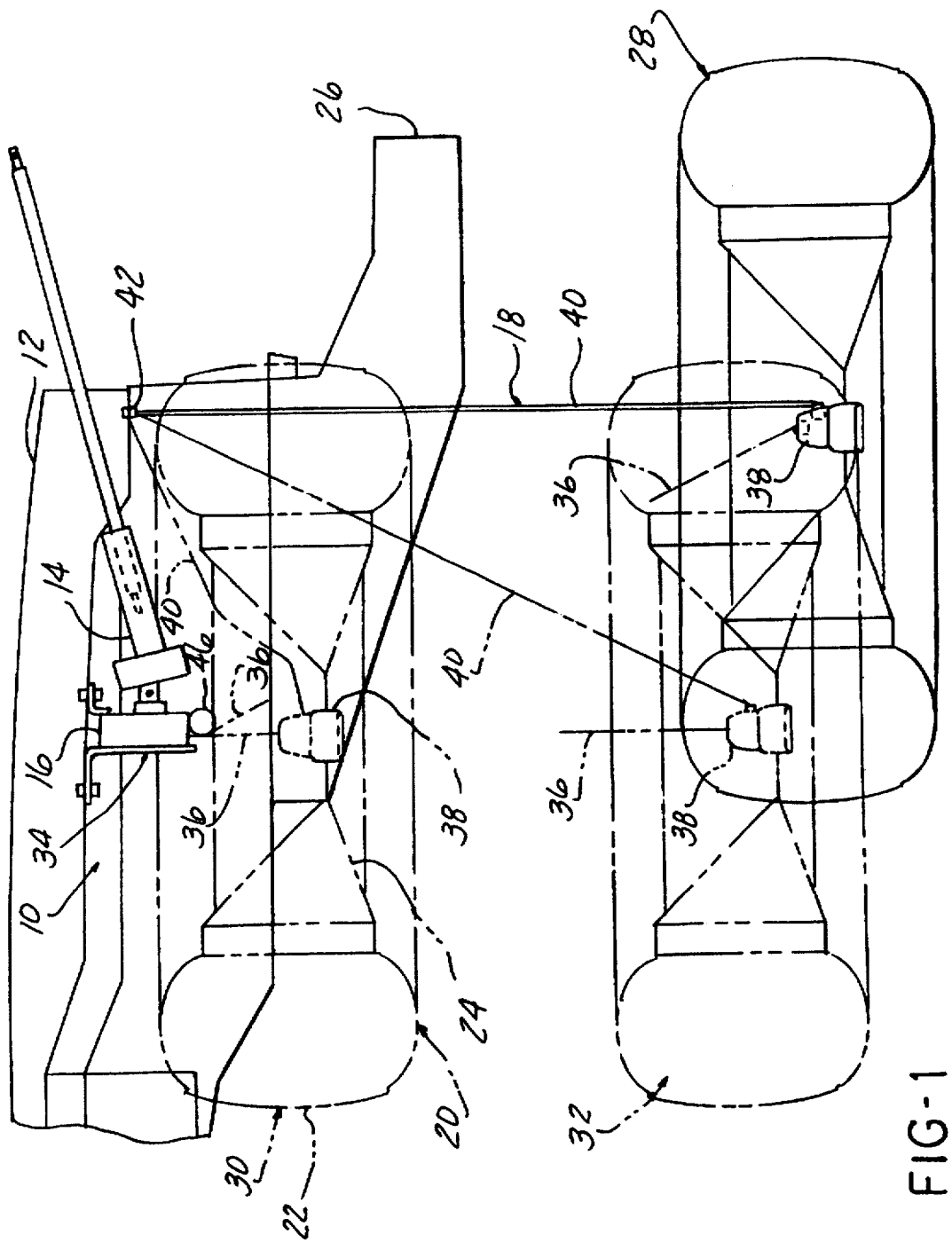
FIG. 1 is a simplified schematic side elevational view of a spare wheel presenter according to the present invention when in the wheel unloading position, and with various positions along the path of travel shown in phantom.

The present invention relates to a spare wheel storage apparatus 10, sometimes referred to as a spare tire lift-and-carry apparatus for use on a vehicle 12. Typically, a spare wheel storage apparatus 10 includes a rotatable input shaft 14 supported by a housing 16. Various types of spare tire lift-and-carry devices 10 can be used advantageously in combination with the present invention. By way of example, and not limitation, a suitable spare tire carrier and winch is disclosed in U.S. Pat. No. 5,228,661, which is incorporated herein by reference. Any details regarding the specific construction and operation of a typical spare tire carrier and winch can be obtained through review of the aforementioned patent.

The present invention addresses the problem of presenting a spare wheel to a vehicle operator, when needed in a wheel unloading position which is convenient and easy for the vehicle operator to have access to the spare wheel for disengagement from the carrier and winch by further manual manipulation. Wheel presentation means 18 is provided according to the present invention for presenting a spare wheel 20, typically including the combination of a tire 22 and rim 24, extending at least partially external of a vehicle body vertical contour 26, such as a bumper or other external vehicle body panel, when the wheel 20 is in a wheel unloading position 28 as illustrated in solid line in FIG. 1. The spare wheel storage apparatus 10 according to the present invention moves a spare wheel 20 from an under vehicle body storage position 30 to a wheel unloading position 28 along a path of travel as illustrated by the intermediate position shown in phantom at 32 of FIG. 1. The storage apparatus 10 may include means 34 for raising and lowering the spare wheel 20 to and from the storage position 30. The means 34 may include a winch having an elongated, flexible member 36 connected to a wheel engaging member 38. Typically, the wheel engaging member 38 engages with the rim 24 to lift the spare wheel 20 to the desired position. The winch, or other means 34, typically is designed to hold the spare wheel 20 in the desired position after having raised the spare wheel 20 to the under vehicle body storage position 30.

The wheel presentation means 18 preferably includes at least one elongated flexible member 40 connected to the wheel engaging member 38 at one end and connected to an under vehicle body portion 42 at an opposite end. Preferably, the flexible member 40 is connected to the vehicle body portion 42 at a position disposed between the storage position 30 and a vertical plane corresponding to an outermost or external periphery of the vehicle body contour 26.

In the preferred configuration illustrated in FIG. 2, first and second elongated, flexible member, 40 and 44 respectively, are provided connected to the wheel engaging member 38 at one end and connected to a vehicle body portion 42 at an opposite end. Each of the first and second elongated, flexible members, 40 and 44 respectively, are connected to the vehicle body portion 42 at positions disposed between the storage position 30 and the vehicle body vertical contour 26. The first and second elongated, flexible members, 40 and 44 respectively, have opposite ends that are preferably level with one another, spaced laterally from one another, and centered with respect to a path of travel for the spare wheel 20 for providing lateral stability of the spare wheel 20 during travel from the storage position 30 to the unloading position 28. Preferably, the first and second elongated, flexible members, 40 and 44 respectively, are rotatably connected to the wheel engaging member 38, as best seen in FIG. 3.

The wheel presentation means 18 modifies the path of travel of the spare wheel 20 from its straight up and down vertical path of travel, typical of a winch-type lift-and-carry mechanism, such that the path of travel has an upper, generally vertical, region of travel and a lower, presentation region of travel. The presentation region of travel having a curved path with a vertical component and a horizontal component of travel. According to the present invention, the spare wheel storage apparatus 10 of the present invention includes means for moving a spare wheel 20 between a storage position 30 and an unloading position 28 along a path of travel, and wheel presentation means 18 for presenting the wheel extending at least to a partially exposed unloading position from underneath the vehicle, wherein a portion of spare wheel 20 protrudes outwardly with respect to a vertical plane corresponding to an outermost external periphery of the vehicle body contour 26 providing easy access for the vehicle operator, and without requiring the vehicle operator to reach underneath the vehicle in order to remove the spare tire from the storage apparatus 10. The presentation region of travel preferably has a vertical component and an non-vertical component of travel. The presentation region of travel also preferably has a non-linear region of travel.

Preferably, the flexible member is a cable or pair of cables attached to the rim retainer or other wheel engaging member and also attached to the rear of the vehicle. If required, a pulley 46 can be supplied adjacent the winch to better guide the cable into the winch and to prevent cross threading. This facilitates a "clean clothes" operation of the spare tire carrier by adding a mechanism to lower the tire and present it to the operator, by moving the wheel toward the operator, thereby eliminating the need for the operator to reach under the vehicle to retrieve the spare tire when lowered.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A spare wheel storage apparatus for moving a spare wheel from an under vehicle body storage position to a wheel unloading position along a path of travel, the storage apparatus including winch means for raising and lowering said wheel to and from said storage position along said path of travel, said winch means including an elongated, flexible member connected to a wheel engaging member, the spare wheel storage apparatus comprising:

wheel presentation means for presenting said spare wheel at least partially external of a vehicle body vertical contour when said spare wheel is in said unloading position, said wheel presentation means including first and second elongated, non-rigid, pliable, multi-directionally flexible members, each of said first and second elongated, flexible members connected to said wheel engaging member at one end and connected to an under vehicle body portion at an opposite end.

2. The spare wheel storage apparatus of claim 1 further comprising:

said path of travel having an upper, generally vertical, region of travel and a lower, presentation region of travel.

3. The spare wheel storage apparatus of claim 2 further comprising:

said presentation region of travel being a non-linear region of travel.

4. The spare wheel storage apparatus of claim 2 further comprising:

said presentation region of travel having a vertical component and a non-vertical component of travel.

5. The spare wheel storage apparatus of claim 1 further comprising:

said first and second elongated, non-rigid, flexible members connected to said under vehicle body portion at positions disposed between said storage position and said vehicle body vertical contour.

6. The spare wheel storage apparatus of claim 5 further comprising:

said first and second elongated, non-rigid, flexible members having said opposite ends level with one another, spaced laterally from one another and centered with respect to said path of travel for laterally stabilizing said wheel during travel from said storage position to said unloading position.

7. The spare wheel storage apparatus of claim 1 further comprising:

said first and second elongated, non-rigid, flexible members rotatably connected to said wheel engaging member.

8. In a spare wheel storage apparatus having a wheel engaging member for moving a spare wheel of a vehicle from a storage position to an unloading position along a path of travel and for holding the spare wheel in the storage position, the improvement comprising:

wheel presentation means for presenting the spare wheel at least partially external of an outermost vehicle body vertical contour when the spare wheel is in the unloading position, the wheel presentation means including first and second elongated, non-rigid, pliable, multi-directionally flexible members, each of said first and second elongated, flexible members rotatably connectible to the wheel engaging member at one end and connectible to a vehicle body portion at an opposite end at positions disposed between the storage position and the outermost vehicle body vertical contour, said opposite ends of said first and second elongated, flexible members spaced laterally from one another with respect to the path of travel of the spare wheel for laterally stabilizing the spare wheel during travel from the storage position to the unloading position, such that the spare wheel follows a path of travel having a generally vertical upper region and a lower, non-linear, presentation region with a vertical component and non-vertical component of travel.

9. In a spare wheel storage apparatus having a wheel engaging member, a raising and lowering mechanism for the wheel engaging member for moving a spare wheel of a vehicle connectible to said wheel engaging member from a storage position to an unloading position along a path of travel and for holding the spare wheel in the storage position, the improvement comprising:

first and second elongated, flexible cables separate from said raising and lowering mechanism and connectible between said vehicle and said wheel engaging member, for translating vertical motion of said wheel engaging member into horizontal movement to present said spare wheel connectible to said wheel engaging member through a non-linear path of travel when lowered by said raising and lowering mechanism from a storage position to an unloading position, each of said first and second elongated, flexible cables connected to said wheel engaging member at one end and connected to an under vehicle body portion at an opposite end.

* * * * *